United States Patent
Couderc et al.

(10) Patent No.: US 12,503,390 B2
(45) Date of Patent: Dec. 23, 2025

(54) NANOSTRUCTURED TRANSPARENT ARTICLE WITH BOTH HYDROPHOBIC AND ANTIFOG PROPERTIES AND METHODS FOR MAKING IT

(71) Applicants: NIKON CORPORATION, Tokyo (JP); Essilor International, Charenton-le-Pont (FR)

(72) Inventors: Sandrine Couderc, Tokyo (JP); Grégory Tortissier, Tokyo (JP)

(73) Assignees: Nikon Corporation, Tokyo (JP); Essilor International, Charenton-le-Pont (FR)

( * ) Notice: Subject to any disclaimer, the term of this patent is extended or adjusted under 35 U.S.C. 154(b) by 488 days.

(21) Appl. No.: 16/624,443

(22) PCT Filed: Jun. 21, 2017

(86) PCT No.: PCT/IB2017/000926
§ 371 (c)(1),
(2) Date: Dec. 19, 2019

(87) PCT Pub. No.: WO2018/234841
PCT Pub. Date: Dec. 27, 2018

(65) Prior Publication Data
US 2020/0131083 A1    Apr. 30, 2020

(51) Int. Cl.
*C03C 17/30*    (2006.01)
*C03C 15/00*    (2006.01)
(Continued)

(52) U.S. Cl.
CPC .............. *C03C 17/30* (2013.01); *C03C 15/00* (2013.01); *C08J 7/12* (2013.01); *C09D 5/00* (2013.01);
(Continued)

(58) Field of Classification Search
CPC ..... C03C 17/30; C03C 15/00; C03C 2217/76; C03C 2218/119; C03C 2218/33;
(Continued)

(56) References Cited

U.S. PATENT DOCUMENTS 6,183,872 B1   2/2001 Tanaka et al.
6,352,758 B1 * 3/2002 Huang ..................... C08K 3/22
                                           428/143

(Continued)

FOREIGN PATENT DOCUMENTS

EP       1300433       10/2002
JP    2005/187936       7/2005
(Continued)

OTHER PUBLICATIONS

Lyons et al, Design and Fabrication of a Hybrid Superhydrophobic-Hydrophilic Surface That Exhibits Stable Dropwise Condensation, ACS Appl. Mater. Interfaces 2015, 7, 23575-23588 (Year: 2015).*

(Continued)

*Primary Examiner* — Nathan L Van Sell
(74) *Attorney, Agent, or Firm* — Norton Rose Fulbright US LLP (57) ABSTRACT

A transparent article having a face provided with a nanostructure, wherein a top part of the nanostructure has hydrophobic properties and a remaining part of the nanostructure confers antifog properties to said face of said transparent article.

18 Claims, 4 Drawing Sheets

Water condensation and rain drop (51) Int. Cl.
 *C08J 7/12* (2006.01)
 *C09D 5/00* (2006.01)
 *C09D 171/00* (2006.01)
 *G02B 1/18* (2015.01)

(52) U.S. Cl.
 CPC ............ *C09D 171/00* (2013.01); *G02B 1/18* (2015.01); *C03C 2217/76* (2013.01); *C03C 2218/119* (2013.01); *C03C 2218/33* (2013.01); *C08J 2371/00* (2013.01)

(58) Field of Classification Search
 CPC ............ C03C 2204/08; C03C 2217/75; C03C 2218/34; G02B 1/18; G02B 1/10; G02B 1/12; C08J 7/12; C08J 2371/00; C09D 5/00; C09D 171/00; B29D 11/00009; B29D 11/00865; B82Y 40/00; B82Y 30/00
 See application file for complete search history.

(56) References Cited

U.S. PATENT DOCUMENTS

| | | | |
|---|---|---|---|
| 7,851,344 B2* | 12/2010 | Kugler | H01L 51/0097 438/599 |
| 8,153,233 B2* | 4/2012 | Sheng | B05D 5/04 428/141 |
| 8,709,588 B2 | 4/2014 | Cadet et al. | |
| 2007/0066078 A1* | 3/2007 | Kugler | H01L 51/0004 438/716 |
| 2007/0166513 A1* | 7/2007 | Sheng | B05D 5/04 428/141 |
| 2010/0112286 A1 | 5/2010 | Bahadur et al. | |
| 2010/0249273 A1* | 9/2010 | Scales | G02B 1/04 977/773 |
| 2012/0243093 A1* | 9/2012 | Tonar | G02B 27/0006 359/507 |
| 2014/0017456 A1* | 1/2014 | Xiao | F28F 13/187 428/195.1 |
| 2014/0314995 A1 | 10/2014 | Liu et al. | |
| 2018/0145625 A1* | 5/2018 | Lyons | H02S 40/10 |

FOREIGN PATENT DOCUMENTS

| | | |
|---|---|---|
| KR | 20170036523 | 4/2017 |
| WO | WO 2009/099924 | 8/2009 |
| WO | WO 2011/094344 | 8/2011 |
| WO | WO 2011/094508 | 8/2011 |
| WO | WO 2011/106196 | 9/2011 |
| WO | WO 2012/020295 | 2/2012 |
| WO | WO2012/048870 | 4/2012 |
| WO | WO 2012/087352 | 6/2012 |
| WO | WO 2015/082521 | 6/2015 |
| WO | WO 2015/082948 | 6/2015 |
| WO | WO-2016089073 A2 * | 6/2016 |
| WO | WO 2017/025128 | 2/2017 |

OTHER PUBLICATIONS

Ahuja, et al., "A Simple Geometrical Approach to Electrically Tunable Superlyophobic Surfaces," *Langmuir*, 24: 9-14, 2008.
International Search Report and Written Opinion Issued in Corresponding PCT Patent Application No. PCT/IB2017/000926, mailed Mar. 16, 2018.
Salvadori, et al., "Design and Fabrication of Microcavity-Array Superhydrophobic Surfaces," *Journal of Applied Physics*, 108: 024908, 2010.
Tuteja, et al., "Design Parameters for Superhydrophobicity and Superoleophobicity," *MRS Bulletin*, 33: 752-758, 2008.
Tuteja, et al., "Designing Superoleophobic Surfaces," *Science*, 318: 1618-1622, 2007.
Vogel, et al., "Transparency and Damage Tolerance of Patternable Omniphobic Lubricated Surfaces Based on Inverse Colloidal Monolayers," *Nature Communications*, 4: 2176, 2013.
Professional English translation of paragraphs [20]—[30], from the specification of previously cited international Publication No. WO2016/089073 (Kim).

* cited by examiner

Water condensation and rain drop

Fluorinated resin or resin + fluorinated coating

FIGURE 4A

Colloidal assembly of nanoparticle (NP)

FIGURE 4B

Dry etching (NP : hard mask)

FIGURE 4C

Dry coating SiO2

FIGURE 4D

Particle removal

FIGURE 4E

FIGURE 6

NANOSTRUCTURED TRANSPARENT ARTICLE WITH BOTH HYDROPHOBIC AND ANTIFOG PROPERTIES AND METHODS FOR MAKING IT

CROSS-REFERENCE TO RELATED APPLICATIONS

This application is a national phase application under 35 U.S.C. § 371 of International Application No. PCT/IB2017/000926 filed 21 Jun. 2017, the entire contents of which are specifically incorporated by reference herein without disclaimer.

The present invention relates in general to a transparent article such as an optical article, for example optical lenses and in particular ophthalmic or sun lenses as well as processes for making such a transparent article.

Antifog and antirain properties are considered antagonistic, since most of the technical solutions for imparting antifogging properties require the surface of the transparent article to be hydrophilic in order to spread water drops into a smooth film, while antirain properties require water repelling surfaces which are hydrophobic or superhydrophobic.

Conventional antifog (hydrophilic) surfaces are not an ideal solution under rain conditions, since rain drops will adhere to such surfaces, and although the drops will spread out, this takes enough time to result in optical distortion and visual impairment.

On the other hand, the use of hydrophobic or superhydrophobic surfaces under conditions where water can condensate on the surface leads to build up of tiny water droplets which result in optical distortion, and can thus interfere with clear vision. When many such droplets are present, this leads to light scattering, inducing the well-known "foggy" effect.

U.S. Pat. No. 8,709,588 relates to an optical article, preferably a lens for spectacles, comprising a substrate provided with a coating comprising silanol groups on the surface thereof and, directly contacting this coating, an anti-fog coating precursor coating, characterized in that the anti-fog coating precursor coating:
is obtained through the grafting of at least one organosilane compound possessing:
a polyoxyalkylene group, and
at least one silicon atom bearing at least one hydrolyzable group,
has a thickness lower than or equal to 5 nm,
has a static contact angle with water of more than 10° and of less than 50°.

The lens can be rendered temporarily antifog by applying a surfactant; However, the lens has no hydrophobic properties.

WO 2015/082521 describes lenses having a surface wherein a hydrophobic material and a hydrophilic material that are deposited thereon. A surfactant is applied to confer temporary antifog property to the lens.

Such solutions suffer from the low durability of the antifog properties. Especially, under rainy conditions, the surfactant is easily "washed off" the surface, and the antifog properties are lost.

For textured surfaces (which are hydrophobic or superhydrophobic surfaces having antirain properties), the above solutions are even more problematic (if not impossible), since it is extremely difficult to ensure that the surfactant would be uniformly applied to the entire surface, including the interior of the structure.

A nanostructured surface having antirain properties comprising nanopillars is disclosed, in particular in International Patent Application WO 2017/025128 while a nanostructured surface comprising nanocavities is disclosed, in particular in International Patent Application WO 2015/082948.

Thus, the aim of the invention is to provide a transparent article, for example an optical lens, having both antifog and antirain properties, in particular without the necessity of spraying and/or wiping a surfactant onto the transparent article surface to impact antifog properties.

The above goals are achieved according to the invention by providing a transparent article having a face provided with a nanostructure wherein a top part of the nanostructure has hydrophobic or superhydrophobic properties and a remaining part of the nanostructure confers antifog properties to said face of said transparent article.

The nanostructure may consist of nanopillars and/or nanocavities, the top parts of the nanopillars and/or the top parts of the nanocavities having hydrophobic or superhydrophobic properties.

Generally, the top part of either the nanopillars or the nanocavities comprises the top of the nanopillars or nanocavities and an adjacent portion extending below the top of the nanostructure.

In a preferred embodiment, the nanostructure comprises nanopillars and the adjacent portion is an annular portion extending from 1 nm up to h/5, more preferably up to h/10, wherein h is the height of the nanopillars expressed in nm, below the top.

In another preferred embodiment, the nanostructure comprises nanocavities and the adjacent portion is a ring-like band of the cavity walls adjacent to the top and extending below the top. Typically, this band extends from 1 nm to h/5, more preferably to h/10 below the top, wherein h is the depth of the cavity.

Typically, the remaining part of the nanopillars or nanocavities have hydrophilic properties. In particular, the nanopillars and nanocavities have walls and at least part of said walls is constituting the remaining part of the nanostructure and has hydrophilic properties.

In another embodiment, the nanopillars or the nanocavities have hydrophobic walls and at least part of said walls have roughened walls, roughness being lower in a top part of said walls and being greater in a bottom part of said walls, constituting the remaining part of the nanostructure. Preferably, the roughness of the walls of the nanopillars or the nanocavities is increasing from the top part to the lower part of the remaining part. Increase of the roughness may be continuous or discontinuous.

Different methods can be used for making the transparent article according to the invention.

A first method comprises the steps of:
a) Providing a substrate having a surface made of a hydrophobic or superhydrophobic material;
b) creating a nanostructure having a hydrophobic or superhydrophobic top part and a remaining part that confers antifog properties to said surface of said transparent article, including a step of selectively etching the hydrophobic or superhydrophobic surface.

In a first embodiment of said first method, step b) of said first method comprises the steps of:
b1) dispersing on the surface of the substrate nanoparticles to form an intermediate structure comprising a monolayer, preferably a close packed monolayer of nanoparticles;

b2) etching the substrate to form a nanostructure comprising nanopillars having nanoparticles on top of the hydrophobic or superhydrophobic surface of the nanopillars;

b3) overcoating the structure with a hydrophilic material; and b4) removing the nanoparticles on top of the nanopillars to expose a hydrophobic or superhydrophobic top part of the nanopillars.

In a second embodiment of said first method, step b) comprises the steps of:

b1) contact printing a hard mask on the surface made of a hydrophobic or superhydrophobic material to transfer from the hard mask onto the surface a material acting as an etching mask;

b2) etching the substrate to form a nano-textured structure having etching mask material on top thereof;

b3) overcoating the nanostructure with a hydrophilic material; and b4) removing the etching mask material on top of the nanostructure to expose a hydrophobic or superhydrophobic top part of the nanostructure.

In a preferred embodiment of said first method, the hydrophobic or superhydrophobic material is a hydrophobic or superhydrophobic coating deposited on a hydrophilic material and step b2) comprises etching up to exposing the hydrophilic material, and step b3) is omitted.

A second method of making an article according to the invention comprises the steps of:

a) providing with a nanostructure a substrate made of an hydrophobic or superhydrophobic organic/inorganic resin or composite resin comprising nanopillars or nanocavities; and b) creating roughness on the surface of at least a lower part of the remaining part of said nanopillars or nanocavities.

Preferably, the roughness on the surface of the nanopillars or nanocavities increases from top to base of the nanostructure.

Examples will now be described with reference to the accompanying drawings wherein.

DEFINITIONS

Hydrophobic property: A material surface is considered hydrophobic when the static contact angle with water is higher than 90°. Typically, conventional hydrophobic surfaces have static contact angles with water ranging from 90° up to 120°. However, static contact angle with water may be equal to or higher than 130°, 135°, 140°.

Superhydrophobic property: A material surface is considered superhydrophobic when the static contact angle with water is equal to or higher than 150°.

Hydrophilic property: A material surface is considered hydrophilic when the static contact angle with water is lower than 90°, preferably lower than or equal to 60°, preferably lower than or equal to 30°.

Antifog Property:

The antifogging properties may be evaluated according to three methods: the "breath test" (qualitative test which does not use any visual acuity measurement), the "hot vapor test" and the "refrigerator test". The breath and the refrigerator tests are considered as generating a low fog stress. The hot vapor test is considered as generating a high fog stress.

A nanostructure confers antifog property if a transparent article bearing the nanostructure passes at least the breath test.

In another embodiment, a nanostructure confers antifog property if a transparent article bearing the nanostructure passes the refrigerator test.

In another embodiment, a nanostructure confers antifog property if it passes the hot vapor test.

Breath Test

For this test, the tester places the lens to be evaluated at a distance of about 2 cm from his mouth. The tester for 3 seconds blows his breath onto the exposed surface of the glass. The tester can visually observe the presence or the absence of a condensation haze.

Yes. Presence of fog.

No. Absence of fog: such a lens is considered as having antifogging properties at the end of the breath test, that is to say it inhibits the haze effect resulting from the fog.

Hot Vapor Test

Before the test, the glasses are placed for 24 hours in a temperature-regulated environment (20-25° C.) and under 50% humidity.

For the test, the glasses are placed for 15 seconds above a heated container comprising water at 55° C. Immediately after, a visual acuity scale located at a distance of 5 m is observed through the tested glass. The observer evaluates the visual acuity as a function of time and according to following criteria:

0. No fog, no visual distortion (visual acuity=10/10)
1. Fog and/or visual distortion allowing a visual acuity>6/10
2. Fog and/or visual distortion allowing a visual acuity<6/10

In another embodiment, the nanostructure confers antifog property if in the hot vapor test, a score of 0 or 1 is obtained. In practical terms, to obtain the score 0 or 1, a wearer having a vision of 10/10 and having placed the transparent article bearing the nanostructure in front of his eye should be able to distinguish the orientation of the "E" letters on the 6/10 line of the Snellen optotype table placed at a distance of 5 meters.

This test makes it possible to simulate the ordinary living conditions where a wearer leans his face towards a cup of tea/coffee or towards a pan filled with boiling water.

Refrigerator Test

For this test, the lenses are placed in sealed boxes containing a desiccant (silica gel). The boxes in turn are placed at least for 24 h in a refrigerator at 4° C. After this time period, the boxes are withdrawn from the refrigerator and the glasses immediately tested. They are then placed in a 45-50% humidity atmosphere and at 20-25° C. A visual acuity scale located at a distance of 4 m is observed through the glass. The observer evaluates the visual acuity as a function of time and according to the same criteria as the hot vapor test (scores 0, 1 or 2).

This test makes it possible to simulate the ordinary living conditions where a wearer leaves a cold and dry place and enters a hot and damp room.

Determination of the static contact angle with water: Water static contact angle (WSCA) measurements are made using sessile drop method. It corresponds to the contact angle between the drop and the surface when this one is horizontal. Water is deionized. A 2 µl water drop is dispensed in once on the surface using a 32 gauge needle. WSCA measurements have been performed using a "KYOWA DM 500" contact angle-meter used in combination with "FAMAS" interface software which provides an automatic detection of drop and make analysis of drop envelope with different functions: circle, ellipsoid and tangent. Ellipsoid function is used for WSCA measurement.

Nanostructure: In the context of the present invention, the expression "nanostructured surface" relates to a surface covered with nano-sized structures. Said nano-sized structures have one dimension on the nanoscale, i.e. ranging from 1 to 1000 nm (nanometer), preferably ranging from 1 to 500 nm, more preferably ranging from 1 to less than 250 nm, even better ranging from 1 to 100 nm. The nano-sized structures can be an array of pillars, cavities or a mix of pillars and cavities. Preferably, the array is a periodic array. In a preferred embodiment, the nano-sized structure is an array of pillars.

For example, the nanostructured surface can comprise an array of pillars defined by a surface fraction ($\phi_s$) of the pillars, a pitch (P) of the pillars and an aspect ratio (H/2R) of the pillars, wherein:
- the surface fraction ($\phi_s$) is equal or greater to 2% and equal or less to 80%;
- the pitch (P) is equal or less to 250;
- the aspect ratio (H/2R) is equal or less to 2.4, where H is the height of the pillars and R is the radius of the pillars;
- the pitch (P), the height (H), the radius (R) of the pillars are expressed in nanometers (nm).

According to an embodiment, the pitch (P) is constant over the nanostructured surface.

According to another embodiment, the pitch varies over the nanostructured surface. The pitch (P) of the pillars has then to be understood as being the average pitch of the pillars as further defined.

According to an embodiment, the radius (R) is constant over the nanostructured surface.

According to another embodiment, the radius varies over the nanostructured surface. The radius (R) of the pillars has then to be understood as being the average radius of the pillars as further defined.

According to an embodiment, the height (H) is constant over the nanostructured surface.

According to another embodiment, the height varies over the nanostructured surface. The height (H) of the pillars has then to be understood as being the average height of the pillars as further defined.

The surface fraction ($\phi_s$) is defined by the total pillar top side surface area determined at a pillar height defined by the entrance opening plane on a reference area divided by the surface of said reference area.

According to an embodiment, the surface fraction ($\phi_s$) is constant over the nanostructured surface.

According to another embodiment, the surface fraction varies over the nanostructured surface. The surface fraction ($\phi_s$) of the pillars has then to be understood as being the average surface fraction of the pillars as further defined.

According to different embodiments of an article of the present invention, that may be combined according to all technically valuable embodiments (Hereafter, the pitch (P), the height (H), the radius (R) are expressed in nanometers (nm):
- the top surface of the pillars is flat or extends outward;
- the surface fraction ($\phi_s$) is equal or greater to 10% and/or equal or less to 75%, for example equal or less to 50%;
- the aspect ratio (H/2R) is equal or less to 1.7, preferably from 0.2 to 1.7;
- according to an embodiment, the aspect ratio (H/2R) is equal or less to 0.80, preferably greater to 0.25 and/or equal or less to 0.70;
- the pitch (P) is equal or greater to 25;
- the pitch (P) is equal or greater to 100, for example equal or greater to 150 and/or equal or less to 230;
- the height (H) is equal or greater to 2 and/or equal or less to 600, for example equal or less to 300;
- the radius (R) is equal or greater to 10 and/or equal or less to 125, for example equal or less than 100;
- the array of pillars is a periodic array, for example is a hexagonal array.

Nanostructured surfaces comprising an array of pillars are also disclosed in the following publications:
- A. Tuteja, W. Choi, M. L. Ma, J. M. Mabry, S. A. Mazzella, G. C. Rutledge, G. H. McKinley and R. E. Cohen, Designing Superoleophobic Surfaces, Science, 2007, 318, 1618-1622, Massachusetts Institute of Technology, Cambridge, Massasuchetts/Air Force Research Laboratory, California, USA
- A. Ahuja, J. A. Taylor, V. Lifton, A. A. Sidorenko, T. R. Salamon, E. J. Lobaton, P. Kolodner and T. N. Krupenkin, Nanonails: A Simple Geometrical Approach to Electrically Tunable Superlyophobic Surfaces, Langmuir 2008, 24, 9-14, Bell Laboratories, Lucent Technologies, New Jersey, USA
- A. Tuteja, W. Choi, G. H. McKinley, R. E. Cohen and M. F. Rubner, Design Parameters for Superhydrophobicity and Superoleophobicity, MRS Bull., 2008, 33, 752-758, Massachusetts Institute of Technology, Cambridge, Massasuchetts/Air Force Research Laboratory, California, USA In another preferred embodiment, the nanostructured surface comprises an array of nanocavities.

Such an array is disclosed in International Patent Application WO-2015/082948.

Briefly, said nanostructured surface comprises an array of contiguous cells defining cavities, the cavities of the cells being separated from each other by intermediate solid material walls, and opened to the environment.

In an embodiment, the cavities have an average height (H) and an average radius (R) which meet the conditions:
- $R \geq 5$ nm, preferably $R \geq 10$ nm;
- $R \leq 250$ nm, preferably $R \leq 200$ nm, better $R \leq 150$ nm and more preferably $R \leq 100$ nm; and
- $H \leq R$, preferably $H < 3R$, preferably $H \leq 1.5R$ and more preferably $H \leq 0.5R$.

The nanostructured surface comprises an array of juxtaposed cells defining cavities, the cavities of the cells being separated from each other by intermediate solid walls and opened to the environment.

The top-view geometry of the cavity, the sidewall shape between two consecutive cavity structures, the top wall profile, and the spatial arrangement of the structures on the substrate can vary. Different structured surfaces can be formed based on the combination of all these features.

The topside geometry of the cavity structure can be regularly, irregularly or randomly shaped. Examples of such shape include but are not limited to, square (delimited by four identical walls), rectangular (delimited by four walls and each two opposite walls are identical), triangular (i.e., delimited by three walls), hexagonal (i.e., delimited by six walls), circular or elliptical (i.e., delimited by one wall), randomly-shaped cavity, and a combination thereof.

The arrangement of the pattern can be a combination of various random or periodical cavity shapes having same or different size, symmetrically, asymmetrically arranged or randomly positioned. It can also be an alternation of random and periodical-shaped cavity structures having symmetrical or random spatial organization or arranged with a combination thereof. Examples of symmetrical spatial arrangement include, but are not limited to, square, hexagonal, octagonal, and staggered.

The width of the wall between two adjacent cavities can be constant along its height or it can vary. Thus, the profile of the wall can be straight (perpendicularly oriented to the substrate), oblique, curvy, re-entrant or overhang. For example, the shape can be columnar, conical, pyramidal, prismatic, curved, inverse trapezoidal, or a combination between columnar and rounded. The angle formed between the horizontal plane and the wall side is defined by $\beta$ and is named the entrance angle. $\beta$ can vary from 0° up to 110°. The top wall of the cavity can be flat, rounded or sharp.

$\beta$ is defined and calculated in the same way when the nanostructures are pillars instead of nanocavities.

Figures showing $\beta$ angle positioning can be found in WO2015082948 for nanocavities and WO2017025128 for nanopillars.

The bottom of cavity can be flat-bottomed or have a surface free of angles such as round-bottomed or cut out in several angles that are less than or equal to 90°.

The wall width of the cavity corresponds to the distance between two adjacent cavities at the highest position on the wall of the cross-section plane defining the cavity entrance opening.

The average width (d) is the average value of the wall width (as defined above) for a set of cavity patterns arranged in an area of 10 µm×10 µm of the structure surface.

The height of the cavity refers to the highest distance between a point in the cross-section plane defining the entrance opening of the cavity and its normal projection on the base plane of the cavity structure.

The average height (H) is the average value of the height of the cavity (as defined above) for a set of cavity patterns arranged in an area of 10 µm×10 µm of the structure surface.

The radius of the cavity refers to the maximum half-distance in the cavity between two diametrically opposed points of the orthogonal projection of the cavity "entrance" opening on the base plane.

The average radius (R) is the average value of the radius of the cavity (as defined above) for a set of cavity patterns arranged in an area of 10 µm×10 µm of the structure surface.

The base plane is defined as a plane orthogonal to the main axis of the cavity and including the lowest point of the cavity.

Nanostructured surfaces comprising an array of cavities are also disclosed in the following documents:

M. C. Salvadori, M. Cattani, M. R. S. Oliveira F. S. Teixeira and I. G. Brown, "Design and fabrication of microcavity-array superhydrophobic surfaces", J. Appl. Phys., 2010, 108, 024908, University of Sao Paulo, Sao Paulo, BraziL;

United States Patent Application US-2010/0112286 (Bahadur et al.);

International Patent Application (PCT) WO-2011/106196 (Mazumder et al.);

International Patent Applications (PCT) WO-2011/094508 (Hatton et al.) and WO-2011/094344 (Hatton et al.);

Article "Transparency and damage tolerance of patternable omniphobic lubricated surfaces based on inverse colloidal monolayers". Nature Communications, 4:2167, DOI:10.1038/ncomms3176, published on 31 Jul. 2013.

Figure 1:
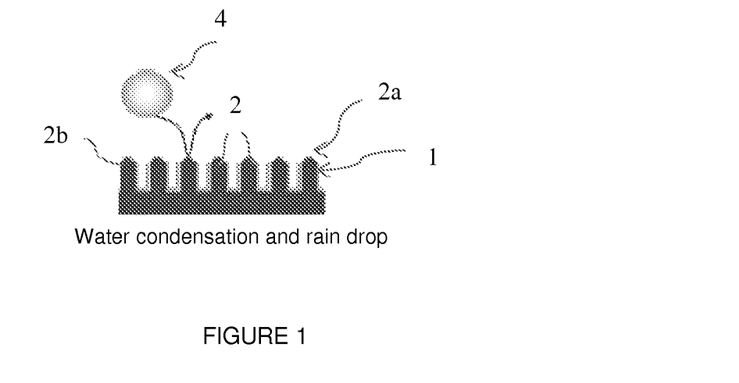
FIG. 1 is a sketch of a nanostructured surface comprising nanopillars according to the invention.
Figure 2:
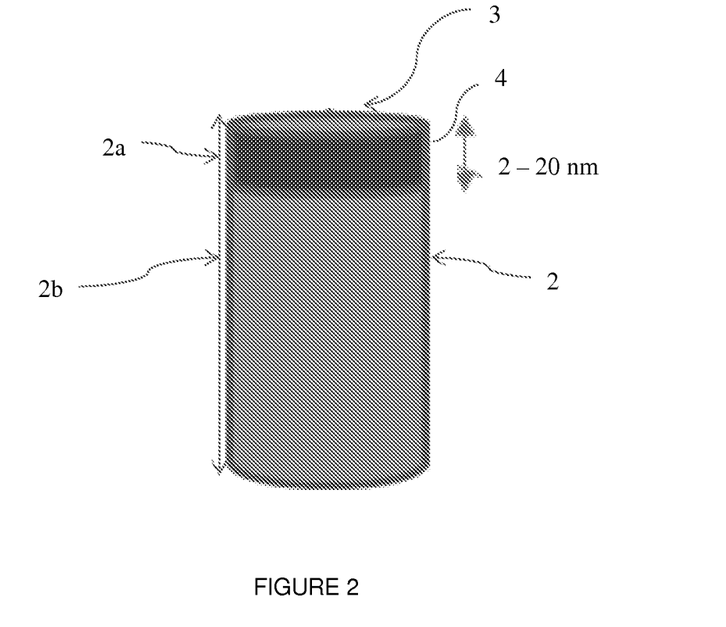
FIG. 2 is a schematic representation of a nanopillar according to the invention.

Referring now to FIGS. 1 and 2, there is schematically represented an embodiment of a nanostructured surface 1 comprising an array of nanopillars 2 of a transparent article according to the invention.

Each nanopillar comprises a top part 2a and a remaining part 2b beneath the top part 2a.

Preferably, the top part 2a typically comprises top 3 of the nanopillar and a short portion 4 adjacent to the top 3 and extending beneath top 3.

The portion of the pillar 2 below the top part 2a constitutes the remaining part 2b of the pillar.

In a preferred embodiment the top part 2a comprises a ring portion extending beneath the top 3 with a height ranging from 1 nm to h/5, preferably from 1 nm to h/10, h being the total height of the pillar. For example, height of the ring portion ranges from 2 to 20 nm, more preferably from 1 to 10 nm.

According to an embodiment of the invention, top part 2a of the pillar has hydrophobic or superhydrophobic properties whereas the remaining part 2b of the nanopillar has hydrophilic properties.

The hydrophobic or superhydrophobic top part 2a may result from the entire nanopillar structure being made of a hydrophobic or superhydrophobic material and, then, the remaining part 2b is coated with a hydrophilic material layer.

On the other hand, the hydrophobic or superhydrophobic top part 2a of the nanopillar is formed by a hydrophobic or superhydrophobic material layer deposited on top of a remaining part 2b either made of a hydrophilic material or rendered hydrophilic by coating with a hydrophilic material.

As shown in FIG. 1, impacting rain drops 4 will bounce off, whereas water condensation that takes place inside the structure will lead to a smooth water film, until completely filling the structure. After completely filling the structure with water condensation, a macroscopically smooth water film is maintained which adheres to the surface. However, thanks to the high contact surface of the nanostructure, the spreading speed of water inside the hydrophilic part of the structure is faster than on a equivalent smooth surface thus, evaporation of the water film also occurs faster.

Even under simultaneous fog and rain condition, such surface would maintain its beneficial property. Although rain drops impacting onto a nano-structure completely filled with water would not bounce off anymore, they would spread out on a liquid film. This takes significantly less time than spreading on a solid surface, thus limiting optical distortion and impairment of vision.

Figure 3A:
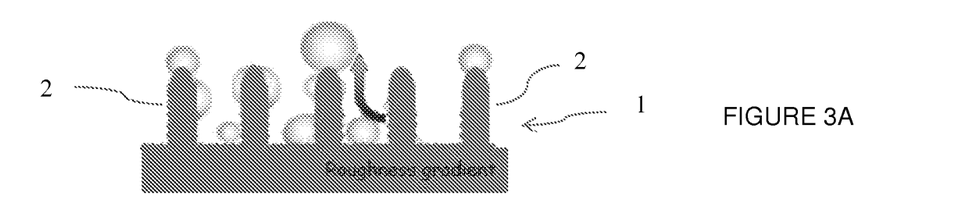
FIGS. 3A to 3C are sketches of a nanostructured surface according to the invention comprising nanopillars with a roughness gradient.
Figure 3B:
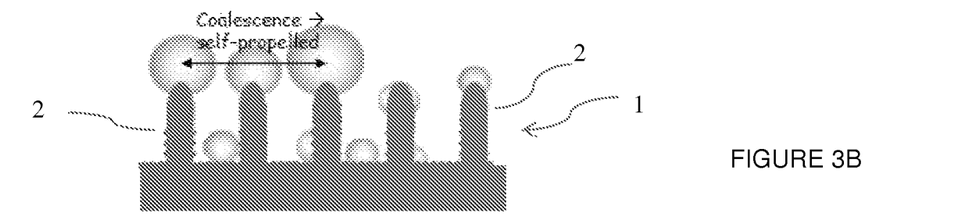
Figure 3C:
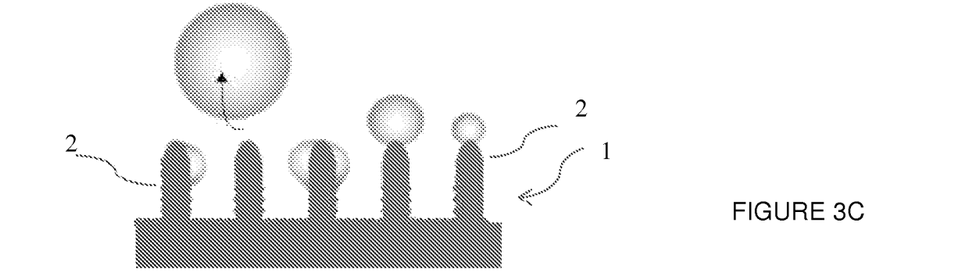

FIGS. 3A to 3C illustrate another embodiment of a nanostructured surface comprising an array of nanopillars of a transparent article according to the invention.

As shown, the nanopillars 2, preferably made of a hydrophobic material, are provided with a roughened surface whose roughness increases from top to bottom.

As the roughness increases, the hydrophobicity of the surface increases. This will lead to a movement of the condensed water towards the top of the nanopillars (FIG. 3A). Moreover, coalescence of tiny water drops (FIG. 3B) leads to self-propelled jumping of the water drops (FIG. 3C), thus eliminating then from the surface.

The roughness can be characterized based on SEM (scanning electron microscopy) images and using if needed image processing software. Preferably the maximum roughness is less than 20 nm, more preferably less than 10 nm, even better less than 5 nm.

The roughness might be Ra or Rq known by the man skilled in the art.

A roughness ratio factor can also be defined. The roughness ratio factor increases from $r_{Min}$ to $r_{Max}$ from to top part of the pillar or cavity to the bottom part of the structure. The roughness ratio factor is defined as the ratio of the textured surface area by its flat projected area (or planar cross sectional area). For flat surface it is equal to 1 and for rough surface it is larger than 1. $r_{Min}$ can vary from 1 to value lower than $r_{Max}$. $r_{Max}$ can vary from 10 to value higher than $r_{Min}$.

FIGS. 4A to 4E illustrate the different steps of a first embodiment of a first method for making a nanostructured transparent article comprising an array of nanopillars according to the invention.

Figure 4A:
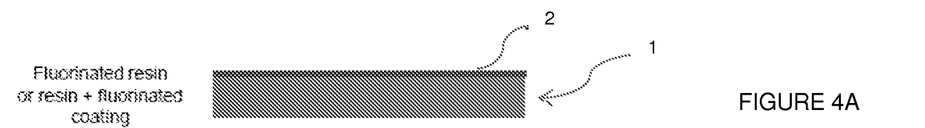
FIGS. 4A to 4E are sketches illustrating the different steps of a first embodiment of a first method for making a nanostructured surface according to the invention comprising nanopillars.
Figure 4B:
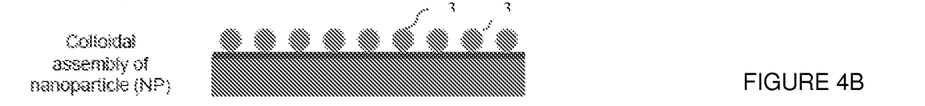
Figure 4C:
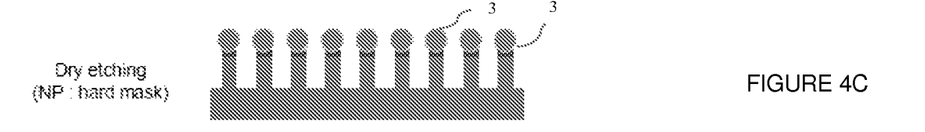
Figure 4D:
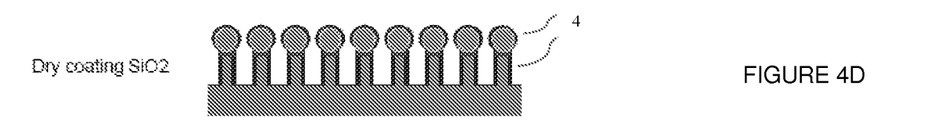
Figure 4E:
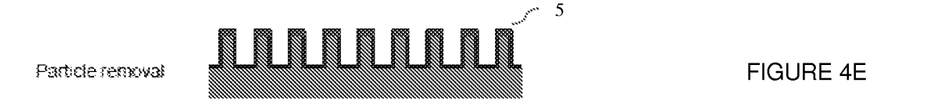

First, a substrate 1 made of an hydrophobic resin (for example a fluorinated resin) or being a surface coated with a hydrophobic coating 2 (for example a fluorinated resin) (FIG. 4A) is used. This surface is thus intrinsically hydrophobic. Nanoparticles 3, for example $SiO_2$, of, for ex. 100-200 nm diameter are dispersed on the surface through colloidal self-assembly or any other suitable techniques (block-copolymer micelle nanolithography . . . ) so that a homogeneous monolayer, preferably a close packed monolayer of nanoparticles is deposited on the surface (FIG. 4B). The diameter of the nanoparticles is chosen as a function of the desired nanopillar diameter, and depends also on the etching speed of the nanoparticles versus etching speed of the resin. Instead of nanoparticles, metal dewetting or metal pattern can act as hard mask.

In the next step (FIG. 4C), a dry etching process is performed, for example by using directional ion etching process. Since the etching rate for the resin is much higher than that of the nanoparticles, this results in a structure having nanoparticles on hydrophobic pillar tops.

In the next step (FIG. 4D), this structure is conformally overcoated with a hydrophilic material 4. Such material can for example be evaporated silica. If the initial surface consists of hydrophilic resin with hydrophobic coating, this step may be skipped, since the etching will have exposed the hydrophilic resin on the pillar sidewalls and at the bottom of the structure.

Finally, the nanoparticles 3 can be removed from the structure (FIG. 4E), thus exposing the hydrophobic tops 5 of the pillars. Removing the nanoparticles can be done by gently wiping the surface, since the nanoparticles do not adhere strongly to the hydrophobic pillar tops.

Ultrasonic treatment is another possibility. Also, a low adhesion tape can be used.

Optionally, an additional step of forming a back filling layer to improve the adhesion of nanoparticle, for example with polyvinyl acetate (PVA) coating that can then be removed by water due to its water solubility can be introduced after dispersion of the nanoparticles.

FIGS. 5A to 5E illustrate a second embodiment of the first method for making a nanostructured transparent article comprising an array of nanopillars according to the invention.

Figure 5A:
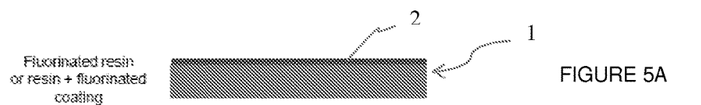
FIGS. 5A to 5E are sketches illustrating the different steps of a second embodiment of the first method illustrated in FIGS. 4A to 4E.
Figure 5B:
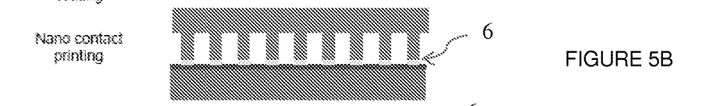
Figure 5C:
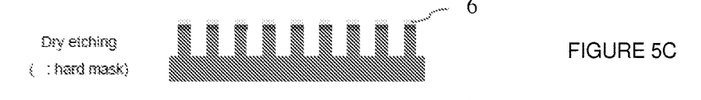
Figure 5D:
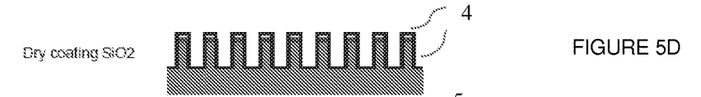
Figure 5E:
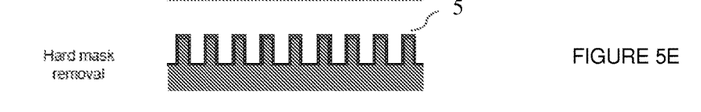

In this second embodiment, the method steps are the same as previously disclosed except that the step of deposition of the nanoparticles is replaced by contact printing a hard mask onto the hydrophobic surface (FIG. 5B) and then transferring a material 6 that will act as an etching mask (FIG. 5C). Other steps of the method are unchanged.

Figure 6:
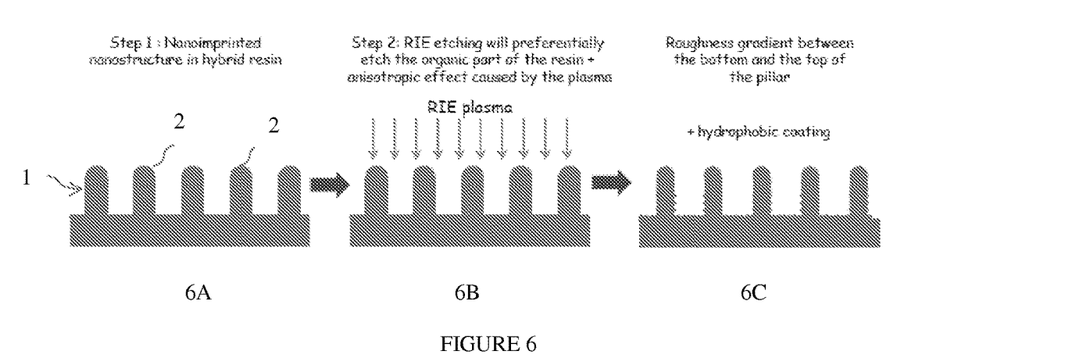
FIGS. 6A to 6C are sketches illustrating the different steps of a second method for making a nanostructured surface according to the invention comprising nanopillars with a roughness gradient.

FIGS. 6A to 6C illustrate an embodiment of a second method for making a nanostructured transparent article comprising an array of nanopillars with increasing roughness from top to bottom according to the invention.

First, a nanostructure 1 comprising nanopillars 2 is created in an organic-inorganic or composite resin substrate using anyone process known to one skilled in the art, for example nanoimprint or two-photon polymerization.

Then, the structure is exposed to reactive ion etching or any other known etching process that can lead to a roughness structure (FIG. 6B).

A nanopillar structure with an increasing roughness from top to bottom of the nanopillars is thus obtained (FIG. 6C).

As an example, a nanopillar structure was fabricated through the use of UV nanoimprint of an Ormostamp® resin substrate, with reactive ion etching (RIE) in presence of oxygen, at a power of 150 W, typically for 15 seconds to 1 minute.

Ormostamp® resin is an organic-inorganic resin. Other organic-inorganic resins can be used such as any resin of the family of Ormocer® from Microresist Technology GmbH (for example Ormocomp®).

The reactive ion etching process will preferentially etch the organic part of the organic-inorganic resin, or in the case of a composite resin, etch one component preferentially.

Figure 7:
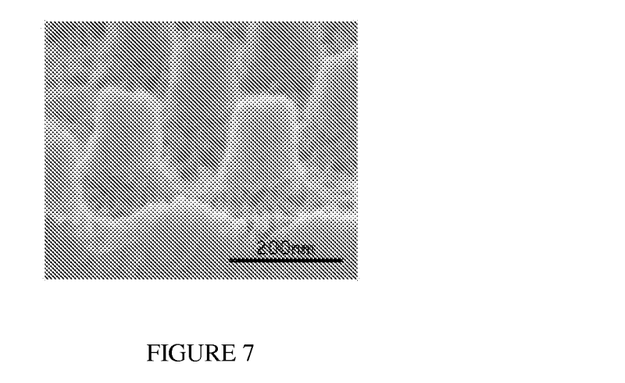
FIG. 7 is a microphotograph of nanopillars with increased roughness at the bottom.

Formation of a roughness gradient has been observed by Field Emission Scanning Electron Microscopy (FE-SEM) as shown in FIG. 7.

According to another embodiment, a mold having a surface comprising a nanostructure with a roughness gradient according to the invention is used and a nano-structure with a roughness gradient is transferred from the mold to the lens surface during the manufacturing process.

The transfer can be implemented so that the nanostructure with the roughness gradient is transferred on the material constituting the substrate itself or transferred using an in-mold coating process wherein a coating bearing a microstructure is transferred from the mold to the lens.

A classical imprint process can be used on an already preformed lens.

Hydrophobic and superhydrophobic materials useful in the present invention are known in the art and are typically fluoropolymers or fluorosilanes.

Such fluoropolymers or fluorosilanes include, but are not limited to, Teflon® and commercially available fluorosilanes such as Dow Corning 2604, 2624 and 2634; Daikin Optool DSX®, Shinetsu OPTRON®, heptadecafluorosilane (manufactured, for example, by GELEST), FLUOROSYL® (manufactured, for example, by CYTONIX); etc. Such coatings can be applied to the nanostructured surface of the article by dipping, vapor coating, spraying, application with a roller, and other suitable method known in the art.

Compositions containing fluorosilanes recommended for the present invention are described in U.S. Pat. No. 6,183, 872. They contain fluoropolymers with organic groups carrying silicon-based groups represented by the following general formula and with a molecular weight of $5.10^2$ to $1.10^5$.

(1)

in which $R_F$ represents a perfluoroalkyl group; Z represents a fluoro or trifluoromethyl group; a, b, c, and e each representing, independently from each other, 0 or an integer greater than or equal to 1, provided that the sum a+b+c+d+e is not less than 1 and that the order of the repeated units between the brackets indexed under a, b, c, d and e are not limited to the one given; Y represents H or an alkyl group comprising from 1 to 4 carbon atoms; X represents an atom of hydrogen, bromine or iodine;

R1 represents an hydroxyl group or a hydrolysable group; R2 represents an atom of hydrogen or a monovalent hydrocarbon group; m represents 0, 1 or 2; n represents 1, 2 or 3; and p represents an integer equal to at least 1, preferably equal to at least 2.

Particularly preferred are perfluoropolyethers of formula:

(1')

wherein Y, R1, m and p are as defined above and a is an integer from 1 to 50.

A formulation containing a fluorosilane given by the previous formula (1) is marketed by DAIKIN INDUSTRIES with the name OPTOOL DSX®.

The document JP-2005-187936 describes fluorinated compounds of silane suitable for the present invention and particularly compounds given by the formula:

(2)

wherein
$R'_F$ is a linear chain divalent perfluoropolyether radical,
R' is an alkyl radical in C1-C4 or a phenyl radical,
X' is a hydrolysable group,
a' is an integer from 0 to 2,
b' is an integer from 1 to 5, and
m' and n' are integers equal to 2 or 3.

A fluorosilane compound given by the formula (2) above is marketed by SHIN-ETSU CHEMICAL CO, Ltd with the name KY-130®.

Fluorosilane compounds given by the formula (2) and methods for preparing the mare also described in the patent application EP1300433.

The invention claimed is:

1. A transparent article having a face provided with a nanostructure, wherein a top part of the nanostructure has hydrophobic properties and a remaining part of the nanostructure confers antifog properties to said face of said transparent article, wherein the nanostructure comprises nanopillars or nanocavities, a top part of the nanopillars or nanocavities having hydrophobic properties, and:
   the top part of the nanopillars only comprises the top of the nanopillars and an adjacent portion extending below the top of the nanopillars, said adjacent portion being an annular portion extending up from 1 nm to h/5 in which h is the height of the pillar(s) expressed in nm, below the top,
   the top part of the nanocavities only comprises the top of the nanocavities and an adjacent portion extending below the top of the nanocavities, said adjacent portion being a ring-like band of the cavity extending from 1 nm to h/5 in which h is the depth of the cavity expressed in nm, below the top,
   and the remaining part of the nanopillars or nanocavities confers antifog properties to said face of said transparent article.

2. The article according to claim 1, wherein the nanostructure comprises nanopillars and said adjacent portion is an annular portion extending up from 1 nm to h/5 wherein h is the height of the pillar(s) expressed in nm, below the top.

3. The article according to claim 1, wherein the top part of the nanostructure has superhydrophobic properties.

4. The article according to claim 1, wherein the nanopillars or the nanocavities have walls and at least part of said walls is constituting the remaining part of the nanostructure and has hydrophilic properties.

5. The article according to claim 1, wherein the nanopillars or the nanocavities have hydrophobic walls and at least part of said walls is constituting the remaining part of the nanostructure and has a roughness which is higher in a lower part of said remaining part than in a top part of said remaining part.

6. The article according to claim 5, wherein the roughness of the walls of the nanopillars or the nanocavities is increasing from the top part to the lower part of said remaining part.

7. The article according to claim 1, wherein the remaining part of the nanostructure has hydrophilic properties.

8. The article according to claim 1, wherein said top part of the nanostructure that has hydrophobic properties comprises fluoropolymers or fluorosilanes.

9. The article according to claim 1, wherein the nanostructure comprises nanocavities, a top part of the nanocavities having hydrophobic properties, and:
   the top part of the nanocavities only comprises the top of the nanocavities and an adjacent portion extending below the top of the nanocavities, said adjacent portion being a ring-like band of the cavity extending from 1 nm to h/5 in which h is the depth of the cavity expressed in nm, below the top,
   and the remaining part of the nanocavities confers antifog properties to said face of said transparent article.

10. The article of claim 1, wherein the nanostructure comprises nanopillars or nanocavities, a top part of the nanopillars or nanocavities having hydrophobic properties, and:

the top part of the nanopillars only comprises the top of the nanopillars and an adjacent portion extending below the top of the nanopillars, said adjacent portion being an annular portion extending up from 1 nm to 20 nm in which h is the height of the pillar(s) expressed in nm, below the top, the top part of the nanocavities only comprises the top of the nanocavities and an adjacent portion extending below the top of the nanocavities, said adjacent portion being a ring-like band of the cavity extending from 1 nm to 20 nm in which h is the depth of the cavity expressed in nm, below the top, and the remaining part of the nanopillars or nanocavities confers antifog properties to said face of said transparent article.

11. The article according to claim 1, wherein the article is an ophthalmic lens.

12. A method for making an article according to claim 1, which comprises the steps of:
   a) providing a substrate having a surface made of a hydrophobic material; and
   b) creating a nanostructure having a hydrophobic top part and a remaining part that confers antifog properties to said face of said transparent article, including a step of selectively etching the hydrophobic surface.

13. The method for making an article according to claim 12, wherein step b) comprises the steps of:
   b1) dispersing on the surface of the substrate nanoparticles to form a structure comprising a monolayer of nanoparticles;
   b2) etching the substrate to form a nanostructure comprising nanopillars having nanoparticles on top of the hydrophobic or superhydrophobic surface of the nanopillars;
   b3) overcoating the nanostructure with a hydrophilic material; and
   b4) removing the nanoparticles on top of the nanopillars to expose a hydrophobic or superhydrophobic top part of the nanopillars.

14. The method for making an article according to claim 12, wherein step b) comprises the steps of:
   b1) contact printing a hard mask on the surface made of a hydrophobic or superhydrophobic material to transfer from the hard mask onto the surface a material acting as an etching mask;
   b2) etching the substrate to form a nano-textured structure having etching mask material on top thereof;
   b3) overcoating the nanostructure with a hydrophilic material; and
   b4) removing the etching mask material on top of the nanostructure to expose a hydrophobic or superhydrophobic top part of the nanostructure.

15. The method for making an article according to claim 13, wherein the hydrophobic or superhydrophobic material is a hydrophobic or superhydrophobic coating deposited on a hydrophilic material and step b2) comprises etching up to exposing the hydrophilic material, and step b3) is omitted.

16. A method of making an article according to claim 1, which comprises the steps of:
   a) providing with a nanostructure a substrate made of an organic/inorganic resin or a composite resin comprising nanopillars or nanocavities; and
   b) creating roughness on the surface of at least a lower part of the remaining part of said nanopillars or nanocavities.

17. The method of claim 16, wherein the roughness on the surface of the nanopillars or nanocavities increases from top to base of the nanostructure.

18. The method for making an article according to claim 14, wherein the hydrophobic or superhydrophobic material is a hydrophobic or superhydrophobic coating deposited on a hydrophilic material and step b2) comprises etching up to exposing the hydrophilic material, and step b3) is omitted.

* * * * *